(12) United States Patent
Cho et al.

(10) Patent No.: US 12,403,890 B2
(45) Date of Patent: Sep. 2, 2025

(54) HYBRID ELECTRIC VEHICLE AND METHOD OF DRIVING CONTROL FOR THE SAME

(71) Applicants: Hyundai Motor Company, Seoul (KR); Kia Corporation, Seoul (KR)

(72) Inventors: Jin Kyeom Cho, Gyeonggi-do (KR); Byeong Hee Yang, Gyeonggi-do (KR); Seong Wook Moon, Seoul (KR); Sung Deok Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 264 days.

(21) Appl. No.: 17/888,209

(22) Filed: Aug. 15, 2022

(65) Prior Publication Data

US 2023/0174046 A1    Jun. 8, 2023

(30) Foreign Application Priority Data

Dec. 2, 2021 (KR) .......................... 10-2021-0170652

(51) Int. Cl.
*B60W 20/16* (2016.01)
*B60W 10/06* (2006.01)
(Continued)

(52) U.S. Cl.
CPC ............ *B60W 20/16* (2016.01); *B60W 10/06* (2013.01); *B60W 10/08* (2013.01); *B60W 10/11* (2013.01);
(Continued)

(58) Field of Classification Search
CPC ...... B60W 20/16; B60W 10/06; B60W 10/08; B60W 10/11; B60W 20/19; B60W 50/14;
(Continued)

(56) References Cited

U.S. PATENT DOCUMENTS 10,829,108 B2    11/2020  Kim et al.
11,519,313 B1 *  12/2022  Martz ..................... F01N 9/00
(Continued)

FOREIGN PATENT DOCUMENTS

JP    2005-146910 A    6/2005
JP    2010-047152 A    3/2010
JP    2016-179740 A    10/2016

*Primary Examiner* — Abby Y Lin
*Assistant Examiner* — Dylan M Katz
(74) *Attorney, Agent, or Firm* — Fox Rothschild LLP

(57) ABSTRACT

The present disclosure relates to a hybrid electric vehicle configured to respond to a required torque while reducing exhaust gas emission in a situation where catalyst heating of an engine is not completed, and a driving control method for the hybrid electric vehicle. The driving control method of the hybrid electric vehicle comprises entering catalyst heating control of an engine when there is a request for catalyst heating and a required torque exceeds a first threshold during traveling in a first mode using an electric motor as a driving source, and entering acceleration feeling increase control when the required torque exceeds a second threshold greater than the first threshold, in which the second threshold is set between the first threshold and a third threshold that is a reference for an entry into a second mode using the engine as the driving source.

19 Claims, 10 Drawing Sheets

(51) Int. Cl.
*B60W 10/08* (2006.01)
*B60W 10/11* (2012.01)
*B60W 20/19* (2016.01)
*B60W 50/14* (2020.01)
*F02D 41/02* (2006.01)
*F16H 61/02* (2006.01)

(52) U.S. Cl.
CPC ............ *B60W 20/19* (2016.01); *B60W 50/14* (2013.01); *F02D 41/024* (2013.01); *F16H 61/0213* (2013.01); *B60W 2050/146* (2013.01); *B60W 2530/12* (2013.01); *B60W 2710/06* (2013.01); *B60W 2710/083* (2013.01); *B60W 2710/1005* (2013.01); *B60W 2710/30* (2013.01); *F16H 2061/0227* (2013.01)

(58) Field of Classification Search
CPC ....... B60W 2050/146; B60W 2530/12; B60W 2710/06; B60W 2710/083; B60W 2710/1005; B60W 2710/30; B60W 2510/068; B60W 2520/10; B60W 2540/10; B60W 20/20; B60W 20/10; B60W 10/10; B60W 30/182; B60W 30/188; B60W 40/107; B60W 2520/105; F02D 41/024; F02D 11/105; F02D 41/08; F16H 61/0213; F16H 2061/0227; F16H 2061/0018; B60K 2006/4825; B60K 6/48; B60Y 2200/92; Y02T 10/62; F01N 3/2013

See application file for complete search history.

(56) References Cited

U.S. PATENT DOCUMENTS

| | | | |
|---|---|---|---|
| 2015/0175153 A1 | 6/2015 | Hashimoto | |
| 2015/0197241 A1* | 7/2015 | Martin | B60W 20/16 903/903 |
| 2016/0152226 A1* | 6/2016 | Lee | B60W 10/08 180/65.265 |
| 2018/0030908 A1* | 2/2018 | Pursifull | F02D 35/023 |
| 2022/0363255 A1* | 11/2022 | Concas | B60W 40/12 |

* cited by examiner

Catalyst heating control not performed

Catalyst heating control in process

Catalyst heating control maintained

Catalyst heating control completed

HYBRID ELECTRIC VEHICLE AND METHOD OF DRIVING CONTROL FOR THE SAME

CROSS-REFERENCE TO RELATED APPLICATION(S)

This application claims, under 35 U.S.C. § 119(a), the benefit of Korean Patent Application No. 10-2021-0170652, filed on Dec. 2, 2021, which is incorporated herein by reference in its entirety.

BACKGROUND

Technical Field

Embodiments of the present disclosure relate to a hybrid electric vehicle capable of responding to a required torque with the exhaust gas maintained still low in a situation where catalyst heating is not completed, and a driving control method for the hybrid electric vehicle.

Description of the Related Art

The recently growing environmental consciousness has increased the prevalence of electric motor-powered eco-friendly vehicles. Eco-friendly vehicles may include electrified vehicles, a representative example of which may be a hybrid electric vehicle (HEV).

HEVs may control an engine and an electric motor, selectively, according to a traveling environment, thereby achieving desirable fuel efficiency. For example, a general HEV may travel in an electric vehicle (EV) mode that uses only power from the electric motor when the speed and the required torque are low, and may travel in an HEV mode that uses power from the engine when the required torque increases from the EV mode.

However, even HEVs may require catalyst heating control before fully using the power from the engine when driving the engine to reduce exhaust gas. The catalyst heating control may generally involve controlling the engine in an idle state for approximately 10 seconds, and be performed for the HEV in preparation for an entry into the HEV mode as the speed and the required torque increase. This will be described in detail with reference to FIG. 1.

FIG. 1 illustrates an example of a catalyst heating control entry condition of a typical hybrid electric vehicle.

Referring to FIG. 1, a vehicle speed and required torque map may be divided into an EV area, an idle area, and a parallel area by a line (indicated as 'level 1') which is a reference line for control level 1 and a line (indicated as 'level 2') which is a reference line for control level 2.

When a vehicle speed and a required torque are within the level 1 line, i.e., in the EV area, a driving mode may be controlled in the EV mode and catalyst heating control may not be performed.

When the vehicle speed and the required torque are in the idle area between the level 1 line and the level 2 line, the driving mode may be controlled in the HEV idle mode and catalyst heating may be performed. In this HEV idle mode, an engine may be disconnected from wheels without transferring driving power to the wheels and may be controlled to be idle driving.

When the vehicle speed and the required torque are in the parallel area over the level 2 line, power from the engine may be transferred to the wheels and the catalyst heating control may not be separately performed.

If, after traveling is started in the EV mode, the vehicle speed and the required torque gradually increase to enter the idle area through the EV area, and then remain in the idle area for a longer time than required for the catalyst heating control, then the catalyst heating control may be completed normally. However, if the vehicle speed and the required torque enter the parallel area before the catalyst heating control is completed in the idle area, then it results in a problem that the driving mode may be changed to an HEV parallel mode before the completion of the catalyst heating control. This will be described in detail with reference to FIG. 2.

FIG. 2 illustrates an example of a situation where catalyst heating control is not completed in a typical HEV.

Referring to FIG. 2, horizontal axes indicate time, collectively, and vertical axes indicate required torque, catalyst heating request (on/off), driving mode, and catalyst heating control (enter/suspend), respectively, in sequential order from top to bottom.

The catalyst heating request may be into an on state in a situation where catalyst heating is required, for example, during a cold operation or when a catalyst temperature drops after a considerable amount of time elapses from the last engine drive. When a vehicle is started to move, it may be controlled in the EV mode. However, in cases where the required torque is increased to exceed the level 1 line by such as a driver of the vehicle depressing the accelerator pedal progressively harder, the driving mode may enter the HEV idle mode as the catalyst heating request is in the on state, and catalyst heating may be started. However, in the HEV idle mode, power from the engine may not be transferred to the wheels, and thus a lower torque than required by the driver may be transferred. In this case, the driver may hardly recognize that the catalyst heating is in process and feel a lack of acceleration, and thus may depress the accelerator pedal harder. Accordingly, the required torque may exceed the level 2 line, and the driving mode may be changed to HEV parallel mode, even when the catalyst heating control is not yet completed. Thus, a great amount of exhaust gas may be emitted.

SUMMARY

Objects of the present disclosure are directed to a hybrid electric vehicle configured to respond to a required torque with the exhaust gas maintained still low in a situation where catalyst heating is not completed, and a driving control method for the hybrid electric vehicle.

Technical aspects of the present disclosure are not limited to the foregoing aspects, and other technical aspects may also be present. Additional aspects of the disclosure will be set forth in part in the description which follows and, in part, will be apparent from the description, or may be learned by practice of the presented embodiments of the disclosure.

According to an exemplary embodiment, there is provided a driving control method of a hybrid electric vehicle comprising: entering catalyst heating control of an engine when there is a request for catalyst heating and a required torque exceeds a first threshold during traveling in a first mode using an electric motor as a driving source; and entering acceleration feeling increase control when the required torque exceeds a second threshold greater than the first threshold, in which the second threshold may be set between the first threshold and a third threshold that is a reference for an entry into a second mode using the engine as the driving source.

For example, the driving control method may further comprise entering the second mode irrespective of whether the catalyst heating control is completed when the required torque exceeds the third threshold.

For example, the entering of the catalyst heating control may comprise outputting information indicating a progress of the catalyst heating control.

For example, the entering of the acceleration feeling increase control may comprise applying a predetermined visual effect to the output information.

For example, the information indicating the progress may comprise remaining time information associated with a remaining time of the catalyst heating control.

For example, the entering of the acceleration feeling increase control may comprise at least one of increasing a charge amount through a starter-generator motor, increasing a maximum torque of the motor to an instantaneous rated torque, and performing a downshift.

For example, the increasing of the charge amount may comprise performing charging with a torque excluding a friction torque of the engine from an output torque of the motor.

For example, the increasing to the instantaneous rated torque may be performed when a possible generation time of the instantaneous rated torque is greater than or equal to a remaining time of the catalyst heating control.

For example, the performing of the downshift may comprise performing the downshift by applying a shift map facilitating downshifts compared to a default shift map.

According to another exemplary embodiment, there is provided a hybrid electric vehicle comprising an electric motor, an engine, and a powertrain control unit. The powertrain control unit may enter catalyst heating control of the engine when there is a request for catalyst heating and a required torque exceeds a first threshold during traveling in a first mode using the electric motor as a driving source, and enter acceleration feeling increase control when the required torque exceeds a second threshold greater than the first threshold, in which the second threshold may be set between the first threshold and a third threshold that is a reference for an entry into a second mode using the engine as the driving source.

For example, the powertrain control unit may enter the second mode irrespective of whether the catalyst heating control is completed when the required torque exceeds the third threshold.

For example, the powertrain control unit may perform control such that information indicating a progress of the catalyst heating control is output through a display device, in response to the entry into the catalyst heating control.

For example, the powertrain control unit may perform control such that a predetermined visual effect is applied to the output information, in response to the entry into the acceleration feeling increase control.

For example, the information indicating the progress may comprise remaining time information associated with a remaining time of the catalyst heating control.

For example, the powertrain control unit may perform control such that at least one of increasing a charge amount through a starter-generator motor, increasing a maximum torque of the motor to an instantaneous rated torque, and performing a downshift is performed during the acceleration feeling increase control.

For example, the powertrain control unit may increase the charge amount by performing charging with a torque excluding a friction torque of the engine from an output torque of the motor.

For example, the powertrain control unit may increase the instantaneous rated torque, when a possible generation time of the instantaneous rated torque is greater than or equal to a remaining time of the catalyst heating control.

For example, the powertrain control unit may perform control such that the downshift is performed by applying a shift map facilitating downshifts compared to a default shift map.

According to exemplary embodiments described herein, the time required for controlling catalyst heating may be obtained through control for increasing a sense of acceleration according to a required torque even in a situation where the catalyst heating of an engine is not completed.

Additional advantages, objects, and features of the disclosure will be set forth in part in the description which follows and in part will become apparent to those having ordinary skill in the art upon examination of the following or may be learned from practice of the present disclosure. The objects and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the present disclosure and are incorporated in and constitute a part of this application, illustrate embodiment(s) of the disclosure, without being limited thereto, and together with the description help for the better understanding of the disclosure. In the drawings.

DETAILED DESCRIPTION

Figure 1:
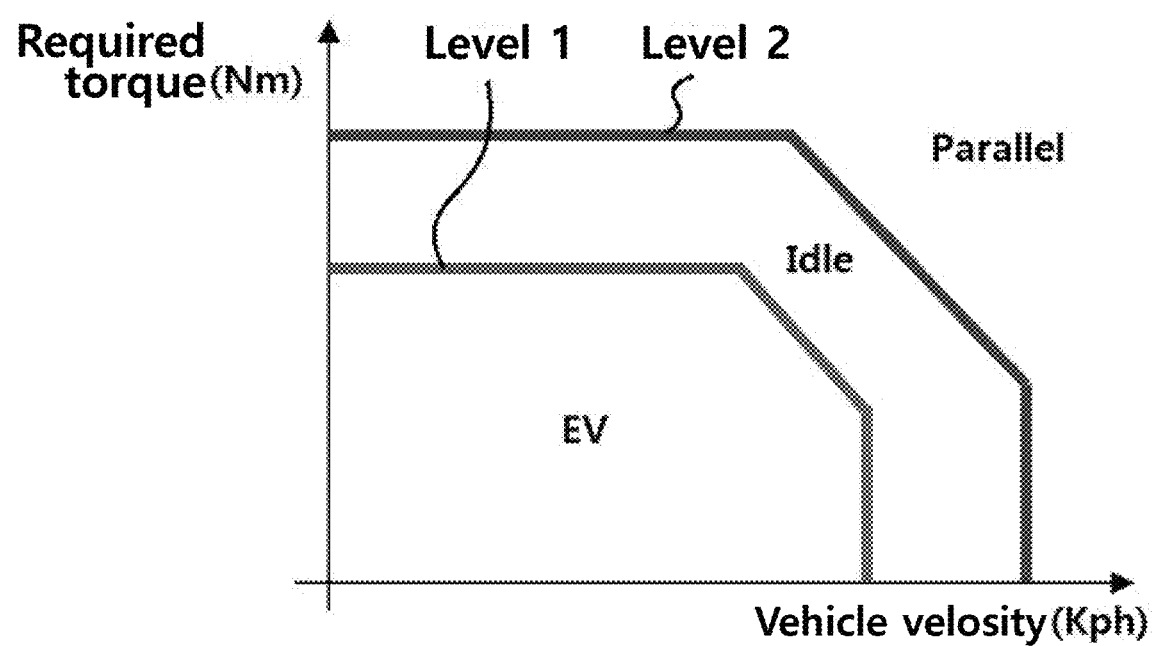
FIG. 1 illustrates an example of a catalyst heating control entry condition of a typical hybrid electric vehicle.
Figure 2:
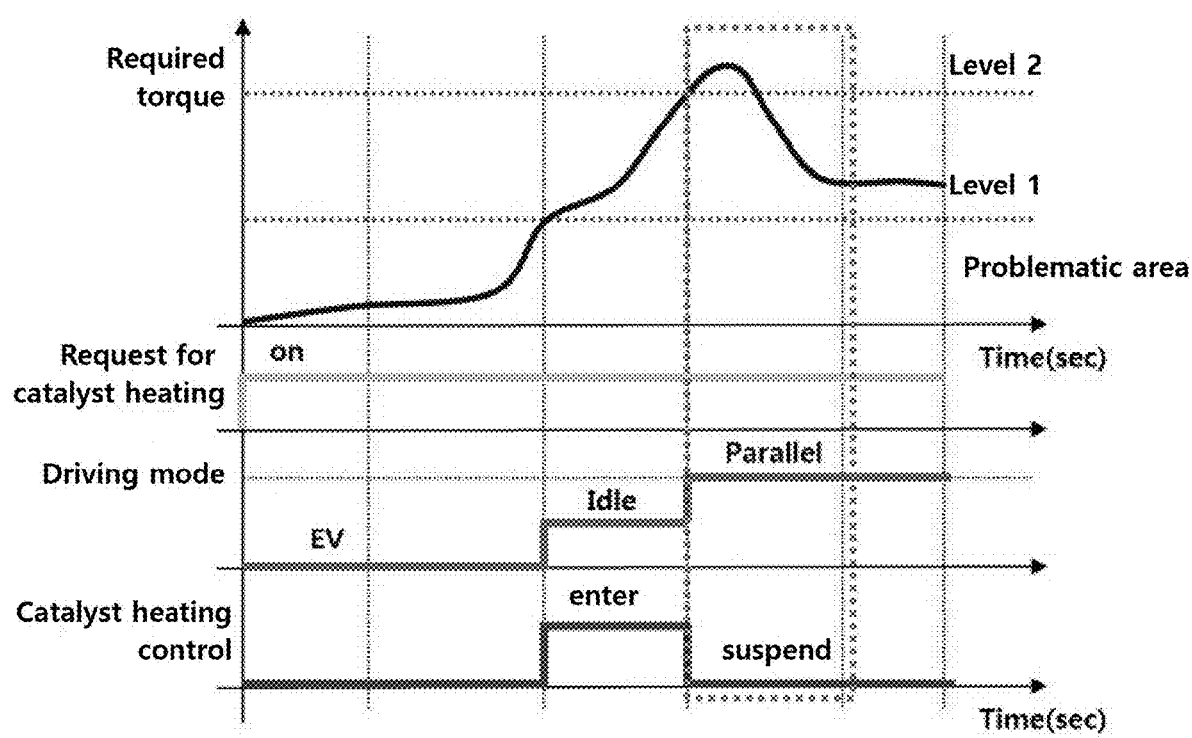
FIG. 2 illustrates an example of a situation where catalyst heating control is not completed in a typical hybrid electric vehicle.

Hereinafter, embodiments of the present disclosure will be described in detail with reference to the accompanying drawings, and the same or similar elements will be given the same reference numerals regardless of reference symbols, and redundant description thereof will be omitted. In addition, a detailed description of well-known features or functions will be ruled out in order not to unnecessarily obscure the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In the following description, the terms "module" and "unit" for referring to elements are assigned and used interchangeably in consideration of convenience of explanation, and thus, the terms per se do not necessarily have different meanings or functions. Further, in describing the embodiments disclosed in the present specification, when it is determined that a detailed description of related publicly known technology may obscure the gist of the embodiments disclosed in the present specification, the detailed description thereof will be omitted. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although terms including ordinal numbers, such as "first," "second," etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

In addition, the term "unit" or "control unit" included in the names of a hybrid control unit (HCU), a motor control unit (MCU), etc. is merely a widely used term for naming a controller that controls a specific vehicle function, and does not mean a generic functional unit. For example, each may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Before describing a driving control method according to exemplary embodiments, a structure and a control system of a hybrid electric vehicle applicable to the exemplary embodiments will be described first.

Figure 3:
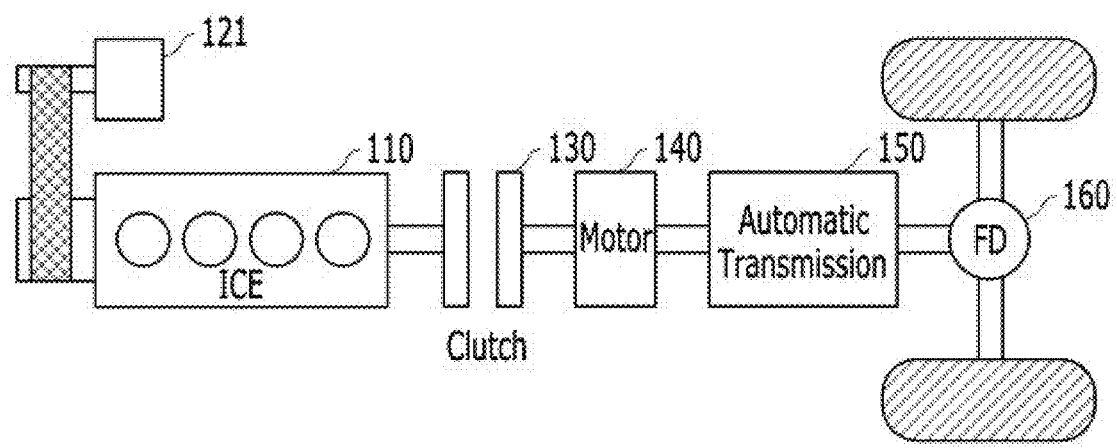
FIG. 3 illustrates an example of a configuration of a powertrain of a hybrid electric vehicle applicable to exemplary embodiments of the present disclosure.

FIG. 3 illustrates an example of a configuration of a powertrain of a hybrid electric vehicle applicable to exemplary embodiments of the present disclosure.

Referring to FIG. 3, illustrated is a powertrain of a hybrid electric vehicle that adopts a parallel-type hybrid system including an electric motor (or a driving motor) 140 and an engine clutch 130 disposed between an internal combustion engine (ICE) 110 and a transmission 150.

In general, in such a vehicle, the motor 140 may be configured to be driven using the power of a battery first as the engine clutch 130 is open when a driver of the vehicle pushes an accelerator (i.e., an accelerator pedal sensor into 'on') after starting the vehicle, and then wheels may be configured to move as the power from the motor 140 is transferred to the transmission 150 and a final drive (FD) 160 (i.e., an electric vehicle (EV) mode). As the vehicle is gradually accelerated and greater driving power is required, an auxiliary motor (or a starter-generator motor) 120 may be configured to operate to drive the engine 110.

Accordingly, a difference in the speed of revolution between the engine 110 and the motor 140 may become within a predetermined range, and the engine clutch 130 may be configured to then become engaged to allow the engine 110 and the motor 140 together to drive the vehicle (i.e., transition from the EV mode to a hybrid electric vehicle (HEV) mode). When a preset engine-off condition is satisfied, for example, when the vehicle is decelerated, the engine clutch 130 may be configured to become open and the engine 110 may be configured to stop (i.e., transition from the HEV mode to the EV mode). In this case, the vehicle may be configured to charge the battery (not shown) with the driving power of the wheels through the motor 140, which may be referred to as regeneration of braking energy or regenerative braking. The starter-generator motor 120 may be configured to perform a function of a starter motor when the engine 110 is started and operate as a generator when rotational energy of the engine 110 is recovered after being started or when the start is off, and may thus be referred to as a hybrid starter generator (HSG).

As the transmission 150, a stepped transmission or a multi-disc clutch, for example, a dual clutch transmission (DCT), may be generally used.

Figure 4:
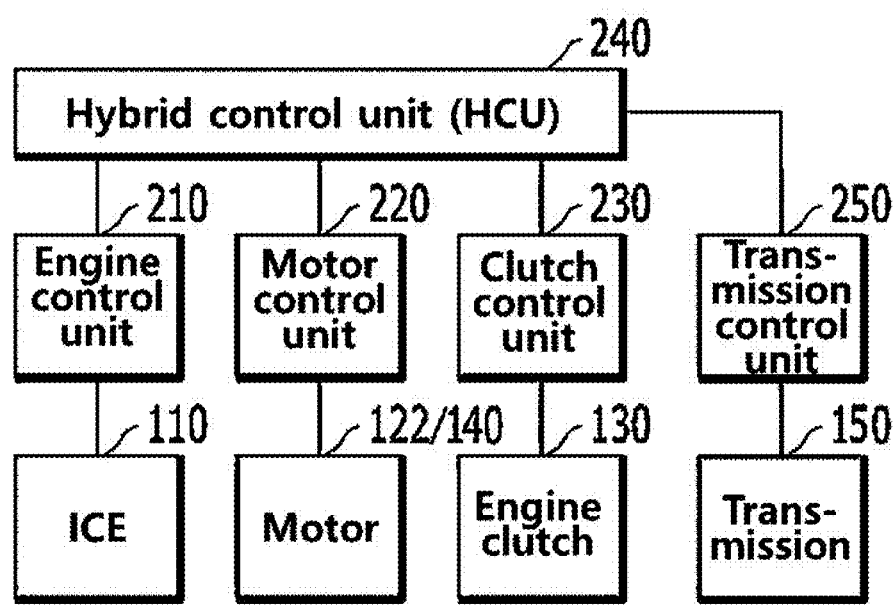
FIG. 4 illustrates an example of a configuration of a control system of a hybrid electric vehicle according to an exemplary embodiment of the present disclosure.

FIG. 4 illustrates an example of a configuration of a control system of a hybrid electric vehicle according to an exemplary embodiment of the present disclosure.

Referring to FIG. 4, in a hybrid electric vehicle applicable to exemplary embodiments described herein, the ICE 110 may be configured to be controlled by an engine control unit 210, the starter-generator motor 120 and the driving motor 140 may be configured to be controlled by a motor control unit (MCU) 220 controlling a torque, and the engine clutch 130 may be configured to be controlled by a clutch control unit 230. The engine control unit 210 may also be referred to as an engine management system (EMS). In addition, the transmission 150 may be configured to be controlled by a transmission control unit 250.

The respective control units may be configured to be connected to a hybrid control unit (HCU) 240 which is an upper-level control unit that controls an overall mode change process. Under the control of the HCU 240, the control units may be configured to provide the HCU 240 with information required for a driving mode change, information required for controlling an engine clutch to shift gear, and/or information required for controlling to stop an engine, or perform operations based on a control signal.

For example, the HCU 240 may be configured to determine whether to perform an EV-HEV mode transition or a charge depleting (CD)-to-charge sustaining (CS) (CD-CS) mode transition depending on a traveling state of the vehicle. To this end, the HCU 240 may be configured to determine a time for releasing (or opening) the engine clutch 130 and perform hydraulic control during the opening. In addition, the HCU 240 may be configured to determine a state (e.g., lock-up, slip, and open states) of the engine clutch 130 and control a time for stopping fuel injection of the engine 110. In addition, the HCU 240 may be configured to transfer a torque command for controlling a torque of the starter-generator motor 120 to the motor control unit 220 to control the stop of an engine, thereby controlling the regeneration of rotational energy of the engine. Further, when controlling a change of the driving mode, the HCU 240 may be configured to control lower-level control units to determine a mode change condition and change a mode.

The relationships between the control units and the functions/classifications of the control units described above are provided as examples, and the relationships and the functions/classifications are not limited thereto. For example, the HCU 240 may be implemented such that its functions are replaced with corresponding ones of any one of the other control units or performed by being distributed by at least two of the other control units.

The configurations described above with reference to FIGS. 3 and 4 are provided as examples of a configuration of a hybrid electric vehicle, and a hybrid electric vehicle applicable to the exemplary embodiments described herein is not limited to the illustrated configurations.

According to an exemplary embodiment, in a case in which catalyst heating control is required, a time required for the catalyst heating control may be configured to be secured using an interval in which acceleration feeling increase control is performed in response to a required torque and a vehicle speed when performing the catalyst heating control.

Figure 5:
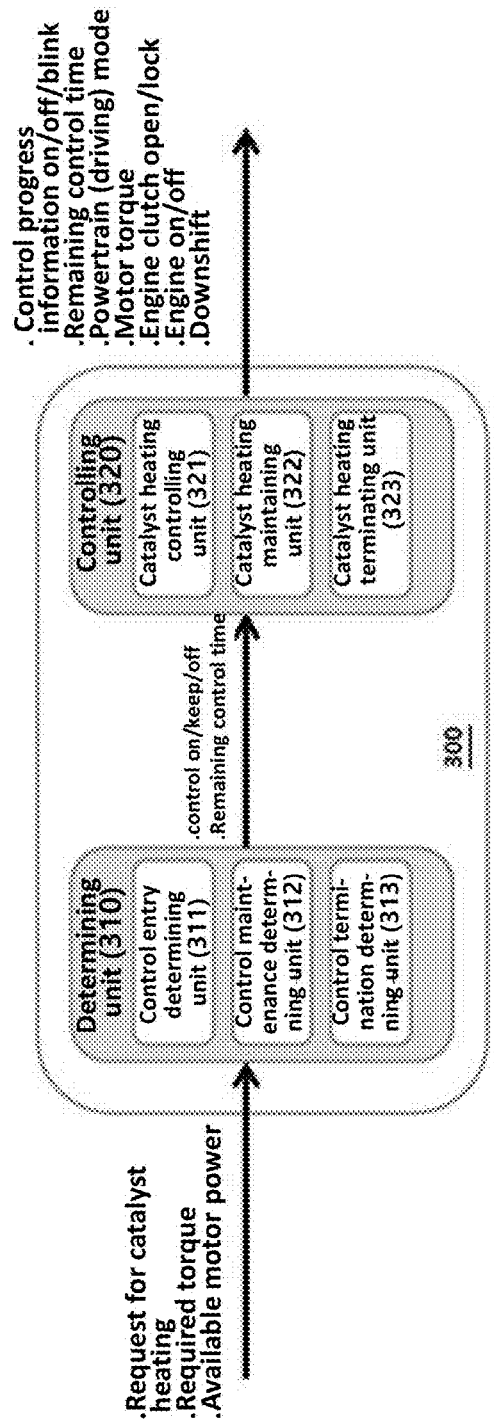
FIG. 5 illustrates an example of a configuration of a powertrain control unit according to an exemplary embodiment of the present disclosure.

FIG. 5 illustrates an example of a configuration of a powertrain control unit according to an exemplary embodiment of the present disclosure.

Referring to FIG. 5, a powertrain control unit 300 may have, as input information, a catalyst heating request, a required torque, and an available motor power, and may have information associated with a progress of catalyst heating control, a powertrain mode (or driving mode), a motor torque command, an engine clutch control command, an engine control command, a transmission (e.g., downshift) command, and the like.

The catalyst heating request may be transmitted from the engine control unit 210, and the required torque may be determined by the HCU 240 based on an accelerator pedal position sensor (APS) value. The available motor power may be determined by the motor control unit 220 or the HCU 240.

In addition, the information associated with the progress of the catalyst heating control may be information required to control an output of visual information that visually indicates a situation of the progress of the catalyst heating control, and include information as to whether the visual information is on, blinking, or off and information associated with a control time remaining until the catalyst heating control is completed. The information associated with the progress of the catalyst heating control may be configured to be transmitted to an output unit configured to output the visual information, for example, a head-up display (HUD), a display of a head unit, a cluster, or the like, but examples of which are not limited thereto.

With an output value, the driving mode may be configured to be controlled by the HCU 240 to be applied. The motor torque, the engine clutch control command, the engine control command, and the transmission command may be transmitted to the motor control unit 220, the clutch control unit 230, the engine control unit 210, and the transmission control unit 250, respectively.

In addition, the powertrain control unit 300 may comprise a determining unit 310 and a controlling unit 320. The determining unit 310 may comprise a control entry determining unit 311, a control maintenance determining unit 312, and a control termination determining unit 313, and the controlling unit 320 may comprise a catalyst heating controlling unit 321, a catalyst heating maintainer 322, and a catalyst heating terminator 323.

For implementation, the powertrain control unit 300 may mainly have an output value associated with controlling a powertrain and may thus be implemented as an upper-level control unit that controls the powertrain overall. For example, when applied to the hybrid electric vehicle described above with reference to FIGS. 3 and 4, the powertrain control unit 300 may be implemented as the HCU 240, but examples are not limited thereto. For another example, the powertrain control unit 300 may be implemented as any one of the control units illustrated in FIG. 4, at least two control units by being distributed, or as a separate control unit different from the control units described above.

Hereinafter, each component of the powertrain control unit 300 will be described in further detail.

The determining unit 310 may be configured to determine a form (on/off/maintain) of catalyst heating control based on at least one set of input information and a remaining control time. To this end, the determining unit 310 may be configured to determine a control level, which may be determined based on at least a required torque.

Figure 6:
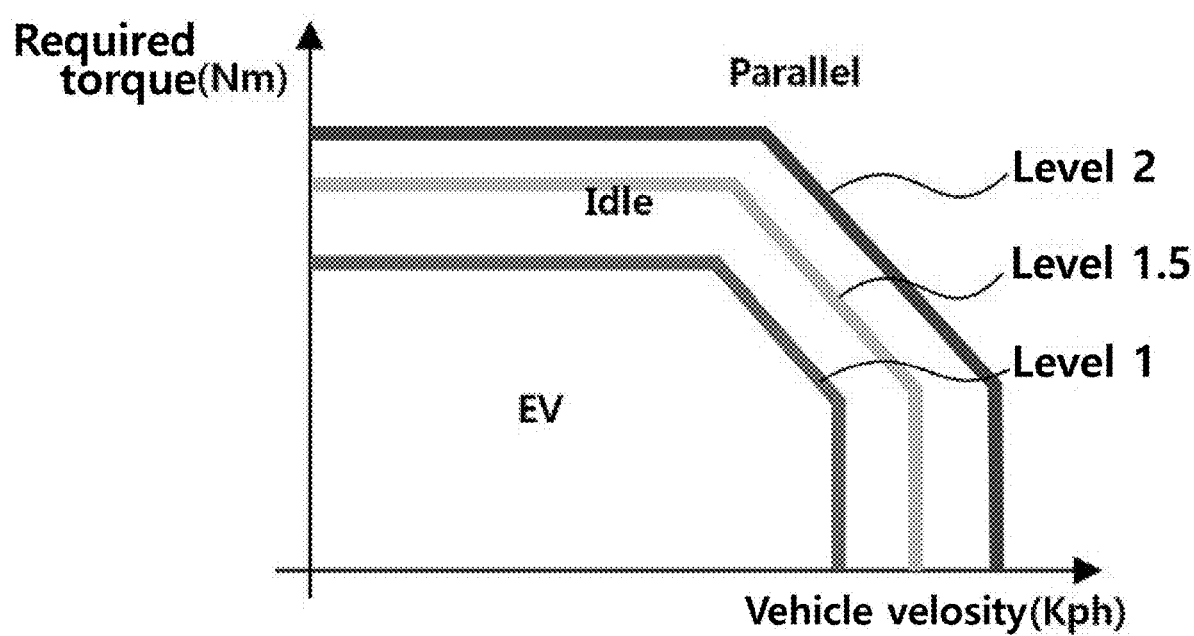
FIG. 6 illustrates an example of a reference map for determining a catalyst heating control level of a hybrid electric vehicle according to an exemplary embodiment of the present disclosure.

FIG. 6 illustrates an example of a reference map for determining a catalyst heating control level of a hybrid electric vehicle according to an exemplary embodiment of the present disclosure.

Referring to FIG. 6, in the reference map, one axis indicates a vehicle speed, and the other axis indicates a required torque. In addition, a level 1 line, a level 2 line, and a level 1.5 line between the level 1 line and the level 2 line may be set.

An EV area may be within the level 1 line, an HEV idle area may be between level 1 line and the level 2 line, and an HEV parallel area may be outside the level 2 line. The level 1.5 line may be disposed between the level 1 line and the level 2 line and may thus be in the HEV idle area. For example, a required torque corresponding to the level 1.5 line may be determined to be a median value between a required torque corresponding to the level 1 line and a required torque corresponding to the level 2 line. However, examples are not limited to the foregoing example.

The control entry determining unit 311 may be configured to determine whether to enter catalyst heating control, and calculate a remaining time. When determining whether to enter, the control entry determining unit 311 may be configured to determine to enter the catalyst heating control when, in response to a situation where there is a request for catalyst heating, a required torque is between the level 1 line and the level 2 line. In addition, the remaining time may be determined based on a rate (experimental value) of an increase in an average catalyst temperature during an operation of the engine 110 in an idle driving state, a difference between a current catalyst temperature and a target temperature.

The control maintenance determining unit 312 may be configured to determine whether to maintain the catalyst heating control after entering the catalyst heating control. For example, the control maintenance determining unit 312 may be configured to determine to maintain the control when a required torque is less than the level 2 line and greater than the level 1.5 line. In this example, the control maintenance determining unit 312 may be configured to also consider whether the required torque continuously increases. That is, when, although the current required torque is less than the level 1.5 line, the required torque is determined to be over the level 1.5 line within a predetermined period of time, the control maintenance determining unit 312 may determine to maintain the control.

The maintaining of the catalyst heating control described herein may be construed as maintaining the catalyst heating control by controlling a powertrain for improving a sense of acceleration in order to prevent a required torque that exceeds the level 2 line by a driver manipulating an accelerator pedal as he/she experiences that the required torque is not satisfied in the HEV idle mode during the catalyst heating control.

The control termination determining unit 313 may be configured to determine whether to terminate the catalyst heating control based on a control termination condition. The control termination control may comprise, for example, i) the required torque being greater than the level 2 line in the presence of a request for catalyst heating, and ii) the absence of the request for the catalyst heating.

Subsequently, the controlling unit 320 may be configured to determine and provide output information of the powertrain control unit 300 based on output information of the determining unit 310.

Specifically, the catalyst heating controlling unit 321 may be configured to perform the catalyst heating control to reduce exhaust gas. For example, for the catalyst heating control, the engine 110 may be configured to maintain approximately 1100 revolutions per minute (RPM) after being cranked in a state where engine clutch 130 is open. In the meantime, the catalyst heating controlling unit 321 may be configured to control information associated with a progress of the catalyst heating control to be displayed through an output unit configured to output visual information, for example, an HUD, a display of a head unit, a cluster, and the like. A detailed form of the output information will be described later with reference to FIG. 7.

Figure 7:
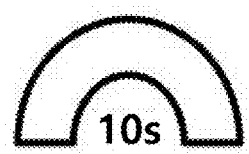
FIG. 7 illustrates an example of visual information based on a catalyst heating control situation output from a hybrid electric vehicle according to an exemplary embodiment of the present disclosure.
Figure 7:
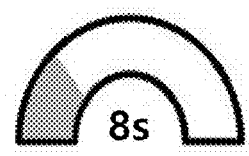
Figure 7:
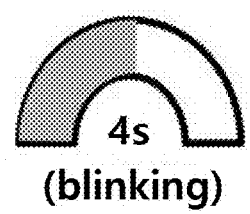
Figure 7:

FIG. 7 illustrates an example of visual information based on a catalyst heating control situation output from a hybrid electric vehicle according to an exemplary embodiment of the present disclosure.

Referring to FIG. 7, information associated with a progress of catalyst heating control may be provided in the form with a gauge and a remaining time combined. For example, when the catalyst heating control is not performed, the gauge may be empty, and the magnitude of the gauge may be set based on a time (e.g., 10 seconds) that is generally consumed to control catalyst heating during a cold operation. However, there may be various changes, for example, the magnitude of the gauge may be set to be a magnitude corresponding to a remaining time for current catalyst heating control.

In contrast, when the catalyst heating control is performed, the gauge may be filled up according to a progress of the catalyst heating control, and a predetermined visual effect (e.g., blinking) may be provided while acceleration feeling increase control is being performed by the catalyst heating maintainer 322 to be described later. In addition, when the catalyst heating control is completed, the gauge may be displayed as being full.

The gauge or remaining time displaying form illustrated in FIG. 7 is provided as an example, and various changes or modifications may be made.

When the catalyst heating control is terminated or completed (i.e., the catalyst heating request being off) to satisfy a torque required by a driver (e.g., a required torque hovering above the level 2 line), the catalyst heating terminator 323 may be configured to allow a driving mode to change from an EV mode to an HEV mode according to the torque required by the driver.

The catalyst heating maintainer 322 may be configured to perform the acceleration feeling increase control to maintain the catalyst heating control. The acceleration feeling increase control may be performed to provide the driver with a sense of acceleration while the catalyst heating control is being performed, and thereby prevent the catalyst heating control from being suspended by the driver manipulating the accelerator pedal.

To allow the driver to substantially experience a sense of increasing acceleration in the HEV idle area, the catalyst heating maintainer 322 may be configured to perform control as follows.

The catalyst heating maintainer 322 may be configured to use a differentiated shift map to allow a downshift to be performed even at the same APS value, compared to when a default shift map is applied. The control may be performed in a form that the catalyst heating maintainer 322 includes a separate shift map to determine a target shift stage based on a vehicle speed and an APS value, and transmits a transmission command to the transmission control unit 250, or may be in a form that, in a state in which the differentiated shift map is provided in the transmission control unit 250, a reference to the set differentiated shift map, in lieu of the default shift map, is instructed to facilitate downshifts. However, examples are not limited to the foregoing.

The increase in the sense of acceleration by the downshift will be described hereinafter with reference to FIG. 8.

Figure 8:
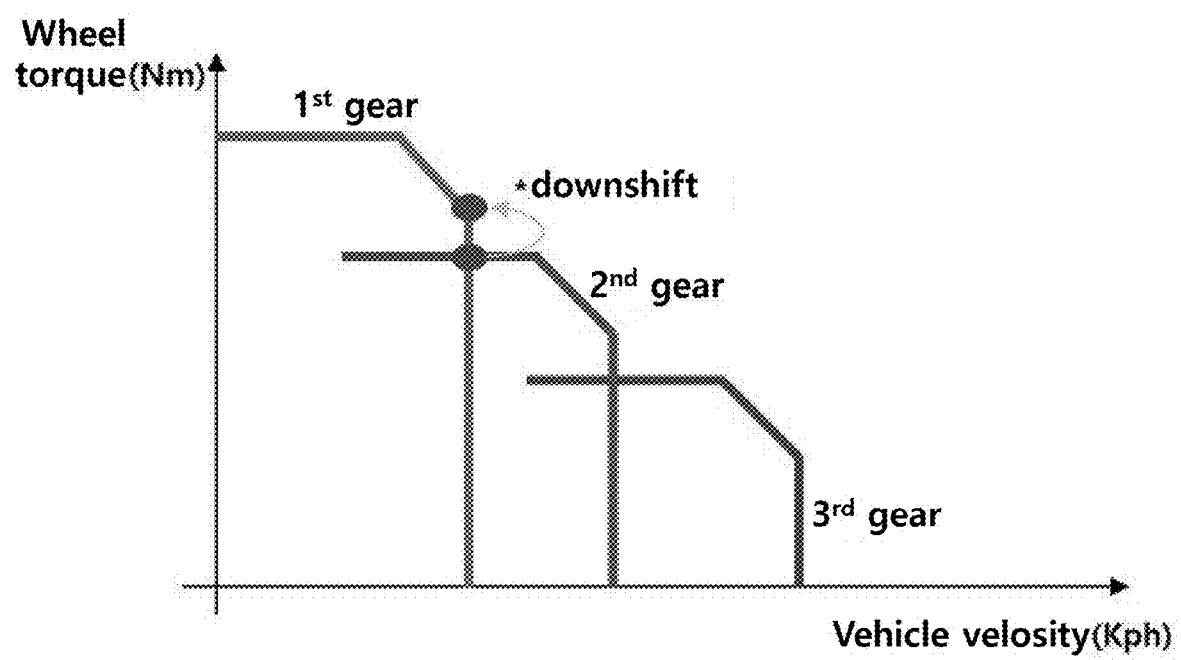
FIG. 8 illustrates an example of an increase in a wheel torque by a downshift of a hybrid electric vehicle according to an exemplary embodiment of the present disclosure.

FIG. 8 illustrates an example of an increase in a wheel torque by a downshift of a hybrid electric vehicle according to an exemplary embodiment of the present disclosure.

Referring to FIG. 8, it may be verified that a maximum wheel torque is limited for each vehicle speed range at each shift stage, and a wheel torque is higher by a downshift at the same vehicle speed. Thus, the downshift may be configured to instantaneously increase a torque of a wheel end of a vehicle, thereby increasing a sense of acceleration experienced by a driver of the vehicle.

The catalyst heating maintainer 322 may be configured to then increase charging power of the HSG 120 to increase a torque of the motor 140 when a required torque increases continuously. That is, in the case of general catalyst heating control, the HSG 120 may be configured to perform charging only with an excess torque obtained by subtracting a friction torque generated when an engine is driven from a torque output from an engine idle RPM. However, in the case of acceleration feeling increase control, a charging amount of the HSG 120 may be actively increased by allowing the engine 110 to output a greater torque. Through this, discharging power of a battery may increase, and a discharge limit value for a motor may increase accordingly and an available motor torque may thus increase. Thus, a torque required by the driver may be satisfied by a more improved motor torque.

In addition, when a remaining catalyst heating control time is less than or equal to an instantaneous rated torque generation time, the catalyst heating maintainer 322 may be configured to allow the motor to generate a rated torque to increase an additional sense of acceleration. The rated torque described herein, which refers to a performance determined during the design of the motor to prevent demagnetization of a permanent magnet provided in the motor, may generally limit a maximum torque of the motor to be less than the rated torque for an electrified vehicle. In addition, the instantaneous rated torque generation time may also indicate a maximum available time for which the demagnetization of the motor does not occur at the rated torque. Thus, through the control described herein, an area in which the rated torque is instantaneously greater than the maximum torque of the motor in a general situation may be used, and thus a sense of acceleration may be increased.

Figure 9:
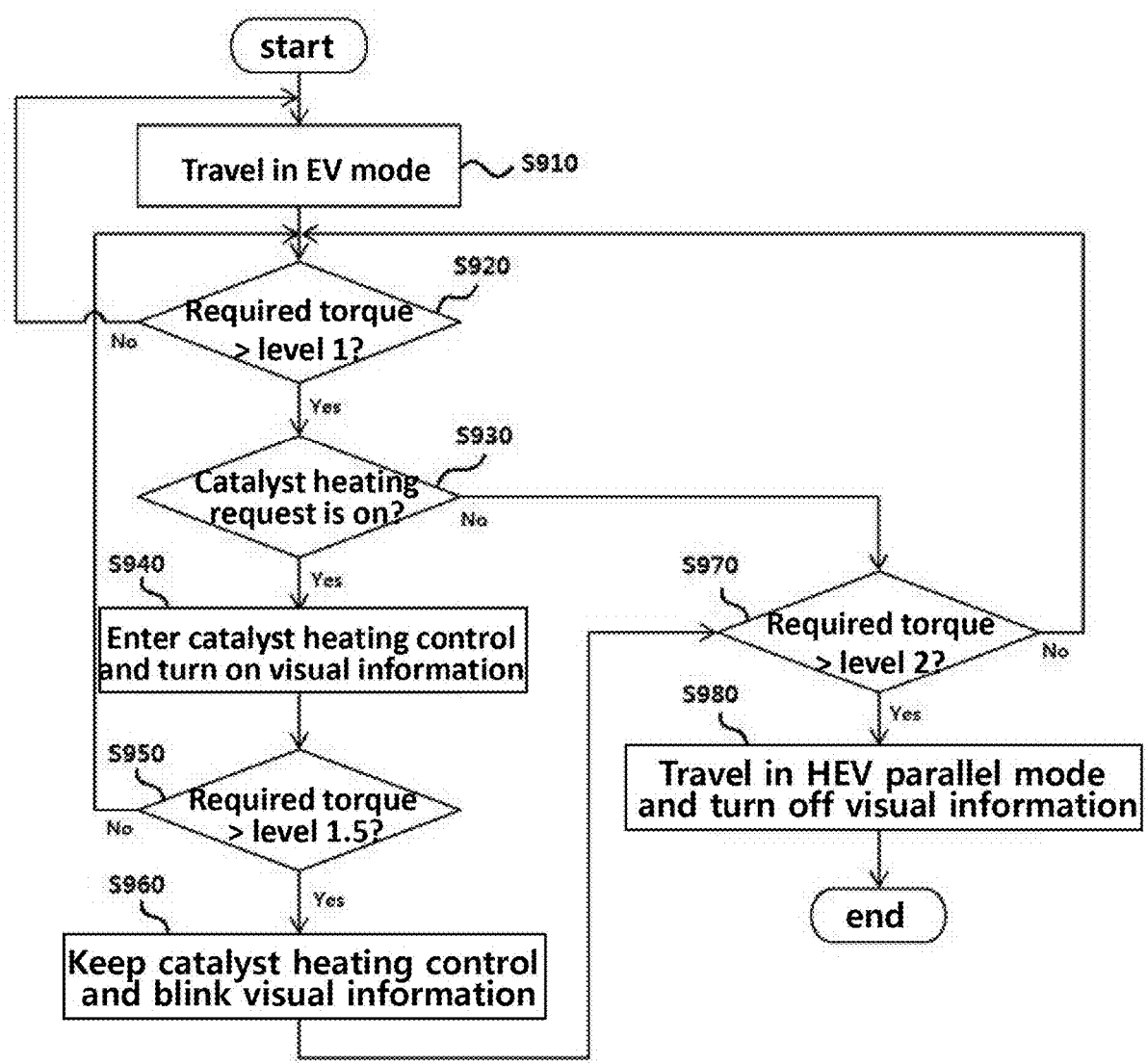
FIG. 9 is a flowchart illustrating an example of a driving control method for a hybrid electric vehicle according to an exemplary embodiment of the present disclosure.

The driving control process described above may be summed up as shown in a flowchart of FIG. 9.

FIG. 9 is a flowchart illustrating an example of a driving control method for a hybrid electric vehicle according to an exemplary embodiment of the present disclosure.

Referring to FIG. 9, in step S910, a vehicle may be configured to start traveling in an EV mode.

When a required torque exceeds a level 1 line during the traveling in the EV mode (Yes in S920) and a catalyst heating request is in an on state (Yes in S930), the determining unit 310 may be configured to determine to enter catalyst heating control in step S940. When the entry into the control is determined, information associated with a progress of the catalyst heating control may be output through a display unit in the vehicle.

Afterward, when the required torque exceeds a level 1.5 line (Yes in S950), the determining unit 310 may be configured to determine to maintain the catalyst heating control, and the controlling unit 320 may be configured to perform acceleration feeling increase control and allow the information associated with the progress of the catalyst heating control to blink in step S960.

When the required torque exceeds a level 2 line (Yes in S970) even though the control corresponding to the determination to maintain the catalyst heating control is determined performed, a transition to an HEV parallel mode may be performed irrespective of whether the catalyst heating control is completed, and the output of the information associated with the progress of the catalyst heating control may be suspended in step S980.

However, when a temperature of a catalyst is already sufficiently high and there is no catalyst heating request (No in S930) in step S930, a transition to the HEV parallel mode may be immediately performed according to the required torque irrespective of the catalyst heating control or the maintenance of the catalyst heating control.

Hereinafter, effects from a driving control method for a hybrid electric vehicle that is described above will be described with reference to FIG. 10.

Figure 10:
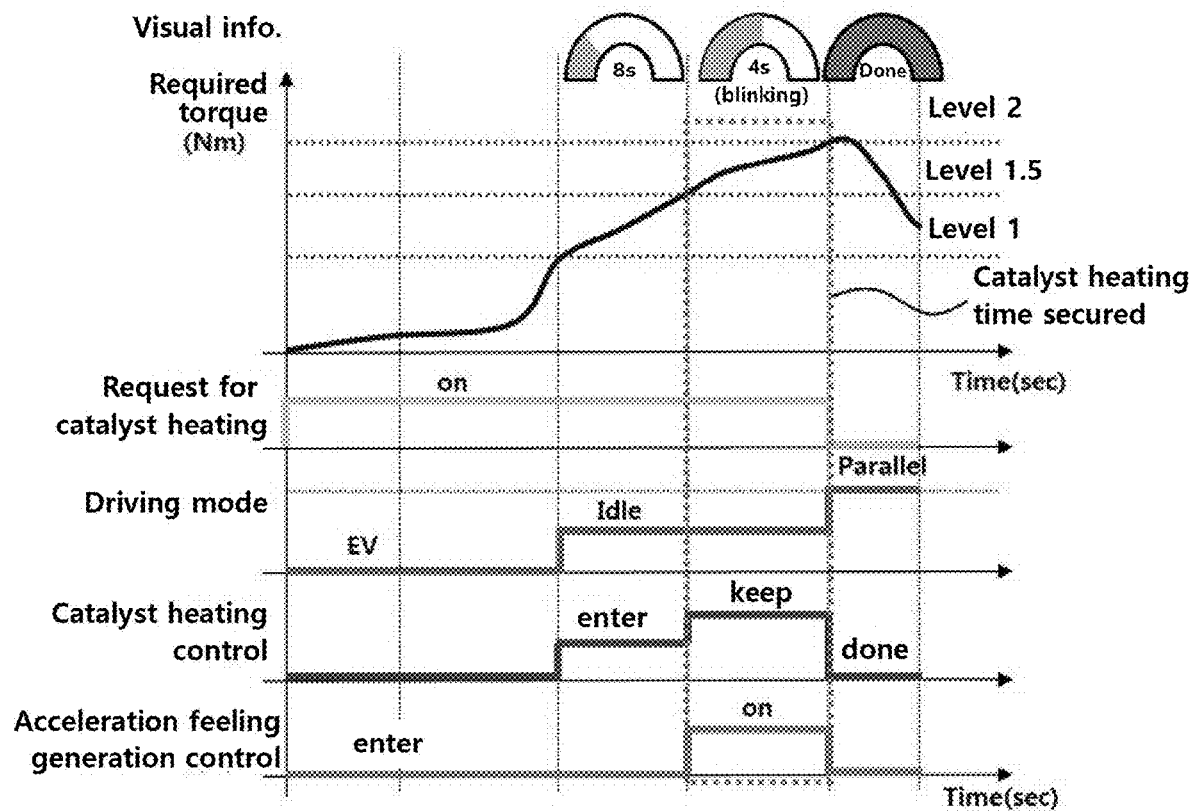
FIG. 10 illustrates an example of an effect of driving control for a hybrid electric vehicle according to an exemplary embodiment of the present disclosure.

FIG. 10 illustrates an example of an effect of controlling the traveling of a hybrid electric vehicle according to an exemplary embodiment of the present disclosure.

Referring to FIG. 10, when a required torque is over a level 1 line in the presence of a request for catalyst heating, visual information may be activated, and catalyst heating control may be started. Afterward, when the required torque becomes over a level 1.5 line, maintenance of the catalyst heating control may be determined, acceleration feeling generation control may be performed accordingly, and the visual information may be started blinking. While the acceleration feeling generation control is being performed, a sense of acceleration may increase, compared to default control, due to an increase in a motor toque (e.g., HSG charging/generation of an instantaneous rated torque), a downshift, or the like, and thus a probability that a driver experiences a lack of torque compared to APS may be reduced. In addition, the catalyst heating situation may be recognized by the blinking visual information, and thus the generation of the required torque exceeding a level 2 line by an excessive APS manipulation may be reduced. Thus, a time for the catalyst heating may be secured and the catalyst heating control may be terminated normally, and the emission of exhaust gas may thereby be reduced.

On the other hand, the present disclosure described above may be embodied as computer-readable code on a medium (e.g., a non-transitory computer readable medium) in which a computer program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

What is claimed is:

1. A driving control method of a hybrid electric vehicle, comprising:
    entering a catalyst heating control of an engine when there is a request for catalyst heating and a required torque exceeds a first threshold during traveling in a first mode, using an electric motor as a driving source; and
    entering an acceleration feeling increase control in an idle state where engine power is not transferred to wheels of the vehicle, when the required torque exceeds a second threshold that is greater than the first threshold and less than a third threshold,
    wherein the second threshold is set between the first threshold and the third threshold, and the third threshold is a reference for an entry into a second mode using the engine as the driving source from the idle state.

2. The driving control method of claim 1, further comprising:
    when the required torque exceeds the third threshold, entering the second mode irrespective of whether the catalyst heating control is completed.

3. The driving control method of claim 1, wherein the entering of the catalyst heating control comprises:
    outputting information indicating a progress of the catalyst heating control.

4. The driving control method of claim 3, wherein the entering of the acceleration feeling increase control comprises:
    applying a predetermined visual effect to the information.

5. The driving control method of claim 3, wherein the information indicating the progress comprises remaining time information associated with a remaining time of the catalyst heating control.

6. The driving control method of claim 1, wherein the entering of the acceleration feeling increase control comprises at least one of:
    increasing a charge amount through a starter-generator motor;
    increasing a maximum torque of the electric motor to an instantaneous rated torque; and
    performing a downshift.

7. The driving control method of claim 6, wherein the increasing of the charge amount comprises:
    performing charging with a torque excluding a friction torque of the engine from an output torque of the electric motor.

8. The driving control method of claim 6, wherein the increasing to the instantaneous rated torque is performed when a possible generation time of the instantaneous rated torque is greater than or equal to a remaining time of the catalyst heating control.

9. The driving control method of claim 6, wherein the performing of the downshift comprises:
    performing the downshift by applying a shift map facilitating downshifts compared to a default shift map.

10. A computer program embodied on a non-transitory computer readable medium, the computer program being configured to control a processor to perform the driving control method of claim 1.

11. A hybrid electric vehicle, comprising:
    an electric motor;
    an engine; and
    a powertrain control unit,
    wherein:
        the powertrain control unit is configured to:
            enter a catalyst heating control of the engine when there is a request for catalyst heating and a required torque exceeds a first threshold during traveling in a first mode using the electric motor as a driving source; and
            enter an acceleration feeling increase control in an in an idle state where engine power is not transferred to wheels of the vehicle, when the required torque exceeds a second threshold that is greater than the first threshold and less than a third threshold, and
        the second threshold is set between the first threshold and the third threshold, and the third threshold is a reference for an entry into a second mode using the engine as the driving source from the idle state.

12. The hybrid electric vehicle of claim 11, wherein the powertrain control unit is configured to:
    when the required torque exceeds the third threshold, enter the second mode irrespective of whether the catalyst heating control is completed.

13. The hybrid electric vehicle of claim 11, wherein the powertrain control unit is configured to:
    in response to the entry into the catalyst heating control, control such that information indicating a progress of the catalyst heating control is output through a display device.

14. The hybrid electric vehicle of claim 13, wherein the powertrain control unit is configured to:
    in response to the entry into the acceleration feeling increase control, control such that a predetermined visual effect is applied to the information.

15. The hybrid electric vehicle of claim 13, wherein the information indicating the progress comprises remaining time information associated with a remaining time of the catalyst heating control.

16. The hybrid electric vehicle of claim 11, wherein the powertrain control unit is configured to:
    control such that at least one of increasing a charge amount through a starter-generator motor, increasing a maximum torque of the electric motor to an instantaneous rated torque; and
    performing a downshift is performed during the acceleration feeling increase control.

17. The hybrid electric vehicle of claim 16, wherein the powertrain control unit is configured to:
 increase the charge amount by performing charging with a torque excluding a friction torque of the engine from an output torque of the electric motor.

18. The hybrid electric vehicle of claim 16, wherein the powertrain control unit is configured to:
 increase the instantaneous rated torque, when a possible generation time of the instantaneous rated torque is greater than or equal to a remaining time of the catalyst heating control.

19. The hybrid electric vehicle of claim 16, wherein the powertrain control unit is configured to:
 control such that the downshift is performed by applying a shift map facilitating downshifts compared to a default shift map.

* * * * *